United States Patent [19]

Vietmeier et al.

[11] Patent Number: 4,898,909

[45] Date of Patent: Feb. 6, 1990

[54] AQUEOUS POLYACRYLATE DISPERSIONS AND THEIR USE FOR THE PRODUCTION OF SELF-ADHESIVE STRUCTURES HAVING GOOD LOW TEMPERATURE ADHESION

[75] Inventors: Juergen Vietmeier, Wachenheim; Peter Pfoehler, Speyer; Gundo Brauch, Wachenheim; Wolfgang Druschke, Dirmstein; Albrecht Zosel, Weinheim, all of Fed. Rep. of Germany

[73] Assignee: BASF Aktiengesellschaft, Ludwigshafen, Fed. Rep. of Germany

[21] Appl. No.: 139,822

[22] Filed: Dec. 30, 1987

[30] Foreign Application Priority Data

Jan. 7, 1987 [DE] Fed. Rep. of Germany ....... 3700248

[51] Int. Cl.$^4$ ............................................. C08L 33/00
[52] U.S. Cl. ..................... 524/820; 524/819; 524/822; 524/823; 524/824; 524/828; 524/831
[58] Field of Search ............... 524/819, 820, 822, 823, 524/824, 828, 831

[56] References Cited

U.S. PATENT DOCUMENTS

| | | | |
|---|---|---|---|
| 3,104,231 | 9/1963 | Fitch | 524/824 |
| 3,202,638 | 8/1965 | Van Ess | 524/824 |
| 3,232,899 | 2/1966 | Guziak | 524/824 |
| 3,242,121 | 3/1966 | Hill | 524/824 |
| 3,244,655 | 4/1966 | Sullivan et al. | 524/824 |
| 3,301,806 | 1/1967 | Guziak et al. | 524/824 |
| 3,324,066 | 6/1967 | Arcangeli et al. | 524/824 |
| 3,401,134 | 9/1968 | Fantl et al. | 524/819 |
| 3,458,466 | 7/1969 | Lee | 524/824 |
| 3,661,827 | 5/1972 | Taft | 524/819 |
| 3,769,251 | 10/1973 | Wiest et al. | 524/819 |
| 3,974,117 | 8/1976 | Illman et al. | 524/824 |
| 3,983,059 | 9/1976 | Sekmakas | 524/824 |
| 4,056,497 | 11/1977 | Reinecke et al. | 526/292.6 X |
| 4,661,557 | 4/1987 | Bubam et al. | 524/824 |

FOREIGN PATENT DOCUMENTS

| | | |
|---|---|---|
| 163145 | 4/1985 | European Pat. Off. |
| 216483 | 4/1987 | European Pat. Off. |
| 227095 | 7/1987 | European Pat. Off. |
| 229374 | 7/1987 | European Pat. Off. |
| 0202884 | 10/1983 | Fed. Rep. of Germany ...... 524/824 |
| 3423765 | 1/1986 | Fed. Rep. of Germany ...... 524/824 |
| 0120713 | 9/1979 | Japan ................................. 524/824 |
| 0940366 | 10/1963 | United Kingdom ................ 524/824 |
| 1259459 | 1/1972 | United Kingdom . |
| 1379233 | 1/1975 | United Kingdom . |
| 1521716 | 8/1978 | United Kingdom . |
| 2159971 | 12/1985 | United Kingdom . |

OTHER PUBLICATIONS

Patent Abstracts of Japan, Band 10, Nr. 196 (M-497)[2552], 10. Jul. 1986; JP-A-61 41 598; & JP-A-61 41 596 (Matsushita Electric Ind. Co., Ltd) 27-02-1986 Zusammenfassung.

Patent Abstracts of Japan, Band 10, Nr. 109 (M-472) [2166], 23. Apr. 1986; JP-A-60 239 290; & JP-Aα229 791 (Mitsubishi Kasei Kogyo K.K.) 28-11-1985, Zusammenfassung.

Patent Abstracts of Japan, Band 10, Nr. 92 (M-468)[2149], 9. Apr. 1986; & JP-A-60 229 791, JP-A-60 229 788, JP-A-60 229 786 (Matsushita Denki Sangyo K.K.) 15-11-1985, Zusammenfassung.

Patent Abstracts of Japan, Band 9, Nr. 155 (M-392)[1878], 29 Jun. 1985; & JP-A-60 30 392 (Mitsubishi Kasei Kogyo K.K.) 15-02-1985, Zusammenfassung.

Patent Abstracts of Japan, Band 8, Nr. 189 (M-321)[1626], 30 Aug. 1984; & JP-A-59 78 896, JP-A-59 78 895 (Mitsubishi Kasei Kogyo K.K.) 07-05-1984, Zusammenfassung.

Primary Examiner—Joseph L. Schofer
Assistant Examiner—J. M. Reddick
Attorney, Agent, or Firm—Oblon, Spivak, McClelland, Maier & Neustadt

[57] ABSTRACT

Aqueous dispersions of copolymers having a glass transition temperature of not more than $-45°$ C. and a K value greater than 80 consist of not less than 80% by weight of acrylates of alkanols of 8 to 12 carbon atoms, from 1 to 4% by weight of $\alpha,\beta$-monoolefinically unsaturated carboxylic acids and/or their amide derivatives and from 0.1 to 3% by weight of $\alpha$-methylstyrene, and are used for the production of self-adhesive structures having good tack at as low as $-40°$ C.

2 Claims, No Drawings

AQUEOUS POLYACRYLATE DISPERSIONS AND THEIR USE FOR THE PRODUCTION OF SELF-ADHESIVE STRUCTURES HAVING GOOD LOW TEMPERATURE ADHESION

The present invention relates to aqueous dispersions of copolymers of acrylates of alkanols of 8 to 12 carbon atoms, which are suitable for coating sheet-like structures for the production of contact adhesive products which have good adhesion, particularly to cold surfaces.

There are a number of known aqueous acrylate copolymer dispersions which give very tacky films when they dry on sheet-like substrates. The copolymers are generally derived from acrylates of alkanols of 4 to 8 carbon atoms and may furthermore contain, as copolymerized units, $\alpha,\beta$-olefinically unsaturated carboxylic acids, such as acrylic acid or methacrylic acid, and other comonomers. For example, British Pat. No. 1,259,459 discloses aqueous dispersions of copolymers of from 84 to 94% by weight of acrylates of alkanols of 4 to 8 carbon atoms, from 3 to 6% by weight of acrylates or methacrylates and from 3 to 10% by weight of methyl methacrylate or acrylonitrile, the said dispersions containing, as emulsifiers, oxyalkylated and sulfated alkylphenols where alkyl is of 8 to 14 carbon atoms. Films produced from these have good "tack" coupled with good cohesion, but their adhesion to surfaces at below 0° C., in particular from −20° to −40° C., is very unsatisfactory.

The aqueous copolymer dispersions disclosed in U.S. Pat. No. 4,056,497 also contain contact adhesive copolymers whose adhesion in general is unsatisfactory and completely inadequate at below 0° C. These copolymers, which generally contain higher acrylates, such as 2-ethylhexyl acrylate, as the principal component, and additionally contain from 0.1 to 10% of vinyl $\alpha$-haloalkanecarboxylates, from 0.1 to 10% of $\alpha,\beta$-ethylenically unsaturated carboxylic acids and from 0 to 10% of hydroxyalkyl acrylates, with or without acrylonitrile, as copolymerized units, must be crosslinked under alkaline conditions, with the result that the adhesive layer can easily become discolored.

British Pat. No. 1,521,716 discloses aqueous copolymer dispersions which contain not less than 80% by weight, based on the monomers, of acrylates of nontertiary alkanols of 8 carbon atoms. These polymers have good heat distortion resistance at 50° C., but they are nontacky at −20° C. and are therefore unsuitable as contact adhesives used for adhesive bonding at low temperature.

U.S. Pat. No. 4,371,659 describes aqueous copolymer dispersions having a solids content of up to 75%, the dispersion described in Example 1 possessing excellent contact adhesive properties at room temperature but being completely useless as a contact adhesive at −20° C., although the glass transition temperature is about −40° C.

It is generally known that a certain degree of tack can be obtained at low temperatures by the addition of plasticizers, even in the case of hard copolymers. For example, the Technical Information Haftklebstoffe 3 (BASF AG) describes a plasticizer-containing formulation for applications at −20° C. Although mixtures of this type have a certain degree of tack at −20° C., their cohesion is completely inadequate.

It is an object of the present invention to provide, in particular, aqueous dispersions of contact adhesive copolymers based on acrylates, which give adhesive films which do not tend to become discolored and have good adhesion at room temperature but also have tack properties coupled with good cohesion at low temperatures of −20° C. and in the extreme case of −40° C.

We have found that this object is achieved, and that 40–70% strength aqueous dispersions of the copolymers having a glass transition temperature of not more than −45° C. and a K value greater than 80 and consisting of (a) from 80 to 98% by weight of nontertiary alkyl acrylates of alkanols of 8 to 12 carbon atoms, (b) from 0 to 18% by weight of acrylates or methacrylates of alkanols of 1 to 4 carbon atoms and/or vinyl esters of carboxylic acids of 2 to 4 carbon atoms and/or (meth)acrylonitrile and/or styrene, (c) from 0 1 to 4% by weight of $\alpha,\beta$-monoolefinically unsaturated mono- and/or dicarboxylic acids of 3 to 5 carbon atoms and/or their amides, which are unsubstituted or substituted at the nitrogen atoms by alkyl of 1 to 4 carbon atoms and/or carboxyl, and/or hydroxyalkyl (meth)acrylates where alkyl is of 2 to 5 carbon atoms, and (d) from 0.01 to 3% by weight of $\alpha$-methylstyrene, do not have the disadvantage of poor tack of the adhesive films at from −20 to −40° C., even without the addition of a plasticizer.

Particularly suitable nontertiary alkyl acrylates of alkanols of 8 to 12 carbon atoms are 2-ethylhexyl acrylate and isooctyl acrylate, as well as n-octyl acrylate, n-decyl acrylate and n-dodecyl acrylate.

Up to 18% by weight, based on the total monomers or on the copolymer, of these acrylates of alkanols of 8 to 12 carbon atoms may be replaced by other nontertiary alkyl acrylates, in particular n-butyl acrylate, and the glass transition temperature of the copolymer must not exceed −45° C.

Particularly important vinyl esters of carboxylic acids of 2 to 4 carbon atoms are those of straightchain carboxylic acids, such as vinyl acetate, vinyl propionate and vinyl n-butyrate. Mixtures of such vinyl esters may also be used. A preferred vinyl ester is vinyl acetate.

Particularly suitable hydroxyalkyl (meth)acrylates are those derived from alkanediols of 2 to 5 carbon atoms, especially 2-hydroxyethyl acrylate and methacrylate, 2-hydroxypropyl and 3-hydroxypropyl acrylate and methacrylate and 4-hydroxybutyl acrylate and methacrylate. 2-hydroxy-3-chloropropyl acrylate is also suitable.

Preferred monoolefinically unsaturated carboxylic acids are monocarboxylic acids of 3 or 4 carbon atoms, i.e. acrylic acid and methacrylic acid, and preferred dicarboxylic acids are fumaric acid and itaconic acid. Mixtures of such carboxylic acids, and crotonic acid, maleic acid and monoalkyl esters of dicarboxylic acids of the stated type, where alkyl is generally of 1 to 4 carbon atoms, such as monomethyl maleate, monoethyl itaconate, monomethyl fumarate and mono-n-butyl maleate, are also suitable. Particularly suitable amides of such carboxylic acids are acrylamide and methacrylamide and itaconic acid monoamide and -diamide.

The copolymers contain preferably from 90 to 95% of copolymerized monomers (a), from 0 to 2% of copolymerized monomers (b) and preferably from 1 to 3% by weight of copolymerized monomers (c). The content of $\alpha$-methylstyrene, also referred to as 2-phenylpropene, is preferably from 1 to 2% by weight, based on the polymer.

The novel copolymer dispersions contain the conventional emulsifiers and dispersants in the conventional amounts. They preferably contain from 0.5 to 2.5, in particular from 1 to 2, % by weight, based on the copolymers, of a mixture of a sulfated alcohol of 12 to 20 carbon atoms and a sodium salt of a sulfosuccinate in a ratio of from 1:10 to 10:1, preferably from 2:10 to 10:10, and from 0 to 2, preferably from 0.1 to 0.5, % by weight, based on the copolymer, of oxyalkylated fatty alcohols and/or fatty amines and/or alkylphenols. The sulfated oxyalkylation products are derived in particular from alkanols of 12 to 20 carbon atoms which may or may not be monoolefinically unsaturated, such as lauryl alcohol, stearyl alcohol, oleyl alcohol or sperm oil alcohol, or alkylamines of 12 to 20 carbon atoms which may or may not be olefinically unsaturated or alkylphenols where alkyl is generally of 8 to 12 carbon atoms, such as n-octylphenol, n-nonylphenol, isononylphenol or n-dodecylphenol, and in general ethylene oxide and/or propylene oxide may be used for the oxyalkylation and the degree of oxyalkylation is in general from 5 to 80, preferably from 10 to 30 moles of alkylene oxide, preferably ethylene oxide, per mole of fatty alcohol, fatty amine or alkylphenol. Furthermore, these oxyalkylation products are sulfated and are generally used in the form of their water-soluble alkali metal or ammonium salts. In addition to the sulfated products of the stated type, the novel dispersions may also contain the abovementioned, corresponding, nonsulfated oxyalkylated fatty alcohols, fatty amines or alkylphenols, although their content in the emulsifier mixture should not exceed 10% by weight, based on the total amount of emulsifier. If the dispersions contain sulfated and nonsulfated alkylene oxide adducts of the stated type, the total amount of the emulsifier should in general not exceed 2.5%, based on the amount of the copolymer.

The K value of the novel copolymers is not less than 80, preferably from 95 to 100, and can be determined according to DIN 53,726, in 0.5% strength solution of the copolymers in tetrahydrofuran at 20° C. The concentration of the novel dispersions can be varied within wide limits. When they are prepared by emulsion polymerization, they generally contain the copolymer in a concentration of from 40 to 70% by weight, based on the dispersion, but may be diluted as desired. After the preparation, their pH is preferably from 2 to 7, but the pH may furthermore be brought to above 7, for example during processing of the dispersions. Values of from 4 to 8 are preferred.

The novel copolymer dispersions can be prepared batchwise or continuously by the conventional method of emulsion polymerization, by copolymerization of the monomers in aqueous emulsion. The conventional water-soluble free radical polymerization initiators, in particular peroxides, e.g. sodium peroxodisulfate, potassium peroxodisulfate and ammonium peroxodisulfate, hydrogen peroxide, tert-butyl hydroperoxide and perborates, may also be used in conventional amounts, in general in an amount of from 0.05 to 1, preferably from 0.2 to 0.5, % by weight, based on the monomers. The polymerization is carried out in general at from 50 to 100° C., preferably from 80 to 95° C. In the novel process, the concomitant use of reducing regulators is advantageous, and the amount of regulator may be from 0.01 to 0.1% by weight, based on the polymer.

Examples of suitable regulators are mercaptans, such as tert-butyl mercaptan and dodecyl mercaptan. The feed process, in which some of the monomers, in general from 0 to 10% by weight, in water, emulsifier and polymerization initiator is initially taken, and the remainder of the monomers and the regulator is added in emulsified form at the polymerization temperature at the rate at which the polymerization proceeds, and in addition an aqueous solution of further polymerization initiator is introduced has proven particularly useful for preparing the novel dispersions. The composition of the initially taken monomer mixture can be the same as or different from the monomer composition of the feed. It is also possible for the composition of the feed to be changed during the feed by adding a monomer composition which differs from the composition of the feed at the time of addition.

The novel polymerization process gives aqueous copolymer dispersions which contain a particularly small number of specks, have little tendency to foam and possess good compatibility with other anionic polymer dispersions and conventional additives and pigments. On drying, the novel copolymer dispersions give clear films which have good water resistance and resistance to tropical climates, good cohesion at room temperature, extremely high tack and good adhesion, especially to surfaces at −20° C., in combination with little cold flow.

The novel copolymer dispersions can advantageously be used for the production of contact adhesive products by coating sheet-like structures. They are particularly suitable for the production of self-adhesive tapes, self-adhesive films and pressure-sensitive adhesive labels, self adhesive wall and floor coverings and self-adhesive antidrumming materials, especially when these articles are to be used at low temperatures.

To assess the adhesive properties of the sheet-like structures coated using the novel contact adhesives, in the Examples below label paper is coated with solvent-free contact adhesive in a manner such that the coating has a thickness of 25 μm (corresponding to an application rate of 25 g/m². 2 cm wide test strips of the coated paper are used, and these strips are stored for 24 hours in a conditioned room at 23° C. and 50% relative humidity. The peel test is carried out to determine the peel strength, the shear test to determine the shear strength and the loop test to determine the tack at −20° C., these test, being carried out as described below.

In the peel test, the test strips are adhesively bonded to a chromium-plated sheet and peeled off parallel to the adhesive film, i.e. at an angle of 180° C., and the force required for this purpose is measured. The peeling rate is 75 mm/minute, and the measurement is carried out at 23° C., one minute after adhesive bonding has been effected.

As a measure of the cohesion of the adhesive film, the shear test is carried out as follows: the test strips are pressed on a high-gloss chromium-plated sheet having an area of 20×25 mm. The sheet is clamped vertically, and the end of the adhesive strip is subjected to a load of 1,000 g. The time taken for the adhesive bond to break under the constant tensile stress of 1,000 g at 23° C. is determined.

In the loop test, a test strip is clamped with both ends in the jaws of a tearing machine. The loop thus formed is brought, at 300 mm/min, toward a steel or polyethylene test specimen at from −20° to −40° C. until one third of the test strip lies on the surface. This strip is immediately pulled off, and the force required for this purpose is recorded. Care is taken to ensure that the test surface is not covered with a deposit of moisture or ice.

In the Examples which follow, parts are The glass transition temperatures stated therein were determined according to ASTM D 3418-2.

EXAMPLES

Preparation of the Polymer Dispersion

The polymerization reactions are carried out in a conventional reaction apparatus equipped with a reflux condenser, a stirrer and a plurality of feed vessels. The procedure is carried out in general so that water and amounts of the emulsified monomer mixture and the initiator are introduced into the reaction vessel. This reaction mixture is subjected to initial polymerization at the desired polymerization temperature in a conventional manner. Thereafter, the remaining emulsified monomer mixture (feed A) and the initiator solution (feed B) and, where relevant, further feeds are metered into the reaction vessel in the course of from 2 to 3.5 hours. The reaction mixture is then kept at the polymerization temperature for a further 1-2 hours. After cooling, some of the polymer dispersions are brought to a higher pH with ammonia or an alkali metal hydroxide, and if necessary further additives are introduced.

EXAMPLE 1

Feed A 230 parts of water,
590 parts of 2-ethylhexyl acrylate,
2 parts of α-methylstyrene,
12 parts of acrylic acid and
10 parts of the sodium salt of a dioctyl sulfosuccinate.

Feed B 26 parts of water and
2 parts of sodium peroxodisulfate.
130 parts of water, 8 parts of feed A and 5 parts of feed B are stirred for 15 minutes at 85° C. Thereafter, the remaining amounts of feed A and B are metered into the reaction vessel in the course of 3 hours at 85° C. When metering is complete, the reaction mixture is kept at 85° C. for 2 hours.

The glass transition temperature of the copolymer is −60° C. and its K value is 105.

EXAMPLE 2

Feed A 230 parts of water,
590 parts of 2-ethylhexyl acrylate,
2 parts of α-methylstyrene,
2 parts of acrylic acid,
0.6 part of tert-dodecyl mercaptan and
3 parts of the disodium salt of an alkyl-substituted (diphenyl ether)-disulfonic acid.

Feed B 25 parts of water and
2 parts of sodium peroxodisulfate.

The polymerization reaction is carried out similarly to Example 1.

The glass transition temperature of the copolymer is −61° C. and its K value is 98.

EXAMPLE 3

Feed A 230 parts of water,
590 parts of 2-ethylhexyl acrylate,
6 parts of α-methylstyrene,
10 parts of acrylic acid,
8 parts of the sodium salt of a dioctyl sulfosuccinate and
2 parts of sodium dodecylsulfate.

Feed B 30 parts of water and
2 parts of sodium peroxodisulfate.

The polymerization reaction is carried out similarly to Example 1.

The glass transition temperature of the copolymer is −59° C. and its K value is 102.

EXAMPLE 4

Feed A 160 parts of water,
580 parts of 2-ethylhexyl acrylate,
12 parts of α-methylstyrene,
8 parts of acrylic acid,
6 parts of the disodium salt of an alkyl-substituted (diphenyl ether)-disulfonic acid and
0.6 part of tert-butyl hydroperoxide.

A Feed B 100 parts of& water and
1 part of the sodium salt of hydroxymethanesulfinic acid.

130 parts of water, 0.6 part of tert-butyl hydroperoxide, 8 parts of feed A and 20 parts of feed B are introduced into the reaction vessel at 60° C. and stirred for 15 minutes. Thereafter, feed A is metered in over 2.5 hours and feed B over 3 hours, the feeds being introduced continuously and at 60° C. The reaction mixture is then stirred for a further 2 hours at 70° C.

The glass transition temperature of the copolymer is −60° C. and its K value is 95.

EXAMPLE 5

Feed A 180 parts of water,
550 parts of 2-ethylhexyl acrylate,
40 parts of dodecyl acrylate,
10 parts of α-methylstyrene,
3 parts of acrylic acid and
6 parts of the disodium salt of an alkyl-substituted (diphenyl ether)-disulfonic acid.

Feed B 40 parts of water,
1 part of L-ascorbic acid and
0.05 part of iron(II) sulfate.

Feed C 40 parts of water and
1 part of L-ascorbic acid.

130 parts of water, 5 parts of 30% strength hydrogen peroxide and 20 parts of feed A are initially taken in the reaction vessel. The reaction mixture is heated to 60° C., after which feed A and B are metered in continuously in the course of 2.5 hours at this temperature. Feed C is then metered in over one hour.

The glass transition temperature of the copolymer is −56° C. and its K value is 93.

EXAMPLE 6

Feed A 230 parts of water,
540 parts of 2-ethylhexyl acrylate,
12 parts of α-methylstyrene,
10 parts of acrylic acid,
50 parts of ethyl acrylate,
8 parts of the sodium salt of a dioctyl sulfosuccinate and
2 parts of sodium dodecylsulfate.

Feed B 30 parts of water and
2 parts of sodium peroxodisulfate.

The polymerization reaction is carried out similarly to Example 1.

The copolymer has a glass transition temperature of −55° C. and a K value of 101.

COMPARATIVE EXPERIMENT 1

Feed A 200 parts of water,
580 parts of n-butyl acrylate,
2 parts of α-methylstyrene,
10 parts of acrylic acid,
8 parts of the sodium salt of a dioctyl sulfosuccinate and
2 parts of sodium dodecylsulfate.

Feed B 30 parts of water and
2 parts of sodium peroxodisulfate.

The polymerization reaction is carried out similarly to Example 1. The copolymer has a glass transition temperature of −43° C. and a K value of 92.

COMPARATIVE EXPERIMENT 2

A commercial aqueous dispersion of a copolymer having a glass transition temperature of −40° C. was included in the testing of the performance characteristics. The K value of the copolymer is >90.

COMPARATIVE EXPERIMENT 3

A mixture of 100 parts of a commercial 50% strength aqueous dispersion of a copolymer of 2-ethylhexyl acrylate and n-butyl acrylate, having a glass transition temperature of −45° C., and 20 parts of a plasticizer based on dioctyl phthalate was also included in the testing of the performance characteristics. The K value of the copolymer is 90.

TABLE 1

Results of the tests of the performance characteristics from the Examples and Comparative Examples

| Example | Peel test (N/2 cm) at 23° C. | Shear test (minutes) at 23° C. | Loop test at −20° C. |
|---|---|---|---|
| 1 | 1.8 | 115 | 3.1 |
| 2 | 1.6 | 30 | 4.0 |
| 3 | 2.3 | 140 | 4.3 |
| 4 | 1.4 | 127 | 3.1 |
| 5 | 1.4 | 83 | 3.3 |
| 6 | 2.3 | 112 | 2.9 |
| Comparative Experiment | | | |
| 1 | 3.2 | 1600 | 0.8 |
| 2 | 8.3 | 700 | 0.4 |
| 3 | 0.2 | 22 | 2.3 |

We claim:

1. A 40–70% strength aqueous dispersion of a copolymer having a glass transition temperature of not more than −45? C. and a K value greater than 80 and consisting of
   (a) from 90 to 95% by weight of one or more nontertiary acrylates of alkanols of 8 to 12 carbon atoms,
   (b) from 0 to 18% by weight of at least one of acrylates or methacrylates of alkanols of 1 to 4 carbon atoms, vinyl esters of carboxylic acids of 2 to 4 carbon atoms, (meth)acrylonitrile or styrene,
   (c) from 0.1 to 4% by weight of at least one of α,β-monoolefinically unsaturated mono- or dicarboxylic acids of 3 to 5 carbon atoms or their amides, which are unsubstituted or substituted at the nitrogen atoms by alkyl of 1 to 4 carbon atoms or carboxyl, or hydroxylalkyl acrylates where alkyl is of 2 to 5 carbon atoms, and
   (d) from 0.01 to 3% by weight of α- methylstyrene.

2. A 40–70% strength aqueous dispersion of a copolymer having a glass transition temperature of not more than −45° C. and a K value of from 95 to 100 and consisting of
   (a) from 90 to 95% by weight of one or more nontertiary acrylates of alkanols of 8 to 12 carbon atoms,
   (b) from 0 to 2% by weight of monomers from the group consisting of butyl acrylate, vinyl acetate, vinyl propionate, vinyl n-butyrate, acrylonitrile and styrene,
   (c) from 1 to 3% by weight of α,β-monoolefinically unsaturated carboxylic acids from the group consisting of acrylic acid, methacrylic acid, fumaric acid and itaconic acid, and
   (d) from 1 to 2% by weight of α-methylstyrene.

* * * * *